United States Patent Office 2,733,169
Patented Jan. 31, 1956

2,733,169

PRESSURE-SENSITIVE ADHESIVE TAPE

Reynold E. Holmen, White Bear Township, Ramsey County, and William E. Lundquist, Savage, Minn., assignors to Minnesota Mining & Manufacturing Company, St. Paul, Minn., a corporation of Delaware No Drawing. Application June 19, 1952,
Serial No. 294,471

4 Claims. (Cl. 117—76)

This invention relates to pressure-sensitive adhesive tapes having a unified fibrous backing, unification being accomplished by impregnation with a soluble amino or amido nitrogen-containing ester polymer composition followed by curing of the polymer to a solvent-resistant, tough and flexible state.

The unified fibrous backing is solvent-resistant, flexible and conformable, weather-resistant, and does not delaminate when the tape is stripped from surfaces to which temporarily adherently applied. Its resistance to solvent is such that lacquer and paint solvents, and in particular soluble color components of colored lacquers, are prevented from seeping through the tape product and defacing the underlying surface. Hence the pressure-sensitive adhesive tapes of this invention are useful as masking tapes and as easily applied oil-resistant protective coverings. Many of these backings are weather-resistant, and do not soften or disintegrate under long-continued exposure to water, or resinify and become brittle or powdery on long-continued exposure to sunlight or abnormally high atmospheric temperatures; hence these pressure-sensitive adhesive tapes are useful for outdoor applications in attaching posters to walls and windows, in sealing packages for shipment or storage, in weather stripping, and in other ways. Many of the compositions employed in providing these novel tape backings provide exceptionally high dielectric strength in addition to oil-resistance and weather-resistance; hence such pressure-sensitive adhesive tapes are also useful for various applications as electrical insulation, particularly since the cured polymeric impregnant contains no sulfur and is non-corrosive to copper wires.

The adhesive tape products of the invention are produced by firmly adhesively bonding to the impregnated and cured fibrous web a coating of a suitable pressure-sensitive tape adhesive, of which many suitable varieties are known. Primer compositions may be applied to the web prior to the adhesive coating, and low-adhesion sizing compositions may be applied to the reverse side of the web, in accordance with well-known practice, where such additions are necessary or desirable. The adhesive coating may be transparent, opaque, or colored. The unified web may likewise be colored if desired, and may be printed or decorated, all as will be apparent to those familiar with the pressure-sensitive adhesive tape art. However these variations form no part of the present invention, which is primarily concerned with the novel unified fibrous backing and its preparation, specific but non-limitative examples of which will now be presented.

Example 1

|  | Mols | Parts by weight |
|---|---|---|
| Phenyldiethanolamine | 6 | 1,090 |
| Dimerized fatty acids | 1.5 | 910 |
| Diglycolic acid | 3.96 | 538 |
| Maleic anhydride | .54 | 53 |

The dimerized fatty acids may be prepared by polymerization of the fatty acids of drying or semi-drying oils, e. g. linseed, soybean, or cottonseed oil, by any of a number of well-known methods; see, for example, the article by C. G. Goebel entitled "Polymerization of unsaturated fatty acids," appearing in the March 1947 issue of the Journal of the American Oil Chemists' Society. The amount employed is calculated on the basis of the analytically determined acid number. Such dimers may contain traces of residual conjugated unsaturation but, for the purpose of this invention, may be considered to be essentially free of such unsaturation.

The above reactants were heated together in the presence of 525 parts by weight of xylol in a closed container under a nitrogen atmosphere and with continuous stirring, the resulting vapors being continuously condensed, the xylol returned to the reaction vessel, and the water removed as formed. Portions of the xylol were later removed periodically to allow the temperature slowly to increase to the desired point. The batch was heated for 8 hours from 140 to 180° C., 8 hours from 185 to 200° C., and 2 hours at 200° C. The product was cooled, and isopropanol and xylol were added to a solids content of 61% as determined by weighing the residue from a weighed sample heated to constant weight in an oven at 100° C. The resulting clear solution had a Gardner-Holdt viscosity of Z to Z-1. The approximate ratio of isopropanol to xylol in the solution was 2:1. The acid number of the resin was 11.3.

To a portion of the solution was added 3% by weight, based on the solids content, of a soluble heat-reactive melamine-formaldehyde resin, 0.06% of phthalic anhydride, and 0.05% of a methylene-bis-phenol antioxidant. The mixture was formed into a thin film, dried, and heated at 100° C. for two hours. A section of the resulting cured film was tested at 25° C. in a Scott Inclined Plane Serigraph, the time required to obtain 10% elongation being approximately 1-4 seconds. The film showed a tensile strength of 152 lbs./sq. in. at 785% elongation, and a modulus of 51 lbs./sq. in. at 100% elongation. It was insoluble in isopropanol:xylol mixtures.

The melamine-formaldehyde resin employed as the aldehydic curing agent was "Melmac 248–8," a resinous heat-reactive or heat-advancing condensation product of melamine, formaldehyde and butanol in solution in a mixture of butanol and xylol.

The mixture of polymer solution and amino-aldehyde resin solution was applied to a porous creped saturating paper as an impregnant, and the saturated sheet was dried and heated at 250° F. for 30 minutes to produce a solvent-resistant, flexible, unified backing which when coated with a pressure-sensitive adhesive layer was useful as a masking tape. The backing was also employed as a removable liner for temporarily covering and protecting the exposed adhesive surface of pressure-sensitive adhesive tapes, e. g. during manufacturing procedures. For the latter purpose, somewhat greater amounts of the aldehydic curing agent is preferred, since the increased stiffness thus obtained in the treated web is of assistance in subsequently removing the liner from the adhesive-coated surface.

Example 2

|  | Mols |
|---|---|
| Phenyldiethanolamine | 1.65 |
| Polyethylene glycol | 2.02 |
| Monoethanolamine | 1.33 |
| Sebacic acid | 4.55 |
| Maleic anhydride | 0.45 |

The reactants were heated together, in the presence of xylol as in Example 1, for 8 hours at 142–187° C. and 8 hours at 187–200° C. The acid number of the polymer was 17.4, and the solution in isopropanol:xylol at 60% solids had a Gardner-Holdt viscosity of about Z.

To a portion of the polymer solution was added 14%, based on the weight of the non-solvent portions, of an alcohol-soluble, heat-reactive phenol-formaldehyde resin and 0.057% of oxalic acid. A thin film of the mixture was dried and cured by heating for 3 hours at 115° C. followed by 1 hour at 130° C. The thin test film had a tensile strength of 107 lbs./sq. in. at 555% elongation, and a modulus of 41 lbs./sq. in. at 100% elongation.

Amino-aldehyde resins such as the resin employed in Example 1 also serve as effective curing agents for the polymer, and provide somewhat improved properties in respect to tensile strength of the cured film. Another portion of the polymer solution was therefore treated with 4% of soluble heat-reactive melamine-formaldehyde resin ("Melmac 248–8") for use as an impregnant for fibrous tape backings. This solution was used to saturate a soft porous creped saturating paper ("Duracel" crepe) having a ream weight of 30 lbs., the weight of dried impregnant being 11.7 grains per 24 sq. in. The sheet was cured by heating for 30 minutes at 250°F. It was then coated with a pressure-sensitive tape adhesive to provide a pressure-sensitive adhesive tape having a high degree of flexibility at low temperatures in addition to extreme oil- and solvent-resistance.

*Example 3*

|  | Mols |
|---|---|
| Phenyldiethanolamine | 5 |
| Monoethanolamine | 5 |
| Sebacic acid | 4.56 |
| Adipic acid | 4.54 |
| Maleic anhydride | 0.9 |

The reactants were heated in xylol, as in the previous examples, for 5 hours at 145–163°C., 4 hours at 163–185°C., and 5 hours at 195–204°C. The product had an acid number of 14.3. The viscosity at 60% solids in isopropanol:xylol was Z–2 (Gardner-Holdt).

After the addition of 4% of soluble heat-reactive melamine-formaldehyde resin and 0.12% oxalic acid, a dried film of the mixture, cured for 2 hours at 100°C. had a tensile strength of 107 lbs./sq. in. at 450% elongation and a modulus of 50 lbs./sq. in. at 100% elongation.

Porous creped paper (30 lbs. "Duracel" crepe) was impregnated with a similar solution, containing the 4% of aldehydic curing agent and the acid catalyst, to the extent of 12.5 grains per 24 sq. in., dry weight. The sheet was heated for 30 minutes at 250°F. and was then coated with adhesive to provide an oil- and solvent-resistant, weather-resistant, strong and tough pressure-sensitive adhesive tape.

Porous flat rope paper ("Flexrope") having a caliper of four mils was similarly impregnated except that in this case only 2% of the melamine-formaldehyde condensation product was added. The solvent resistance of this product was somewhat lower than that employing the higher proportion of curing agent, but the toughness and flexibility of the sheet material was increased. The adhesive-coated product had an extremely high dielectric strength of 3470 volts, and was useful as an oil-resistant electrical insulating tape as well as for other purposes.

*Example 4*

|  | Mols |
|---|---|
| Phenyldiethanolamine | 7 |
| Monoethanolamine | 3 |
| Adipic acid | 9.1 |
| Maleic anhydride | 0.9 |

The mixture in xylol was heated for 6 hours at 142–200°C. and 2½ hours at 200–205°C., with elimination of water to produce a polymer having an acid number of 9.9 and a viscosity of Z–4, Gardner-Holdt, at 60% solids in isopropanol:xylol.

Addition of 4% of soluble heat-reactive melamine-formaldehyde resin and 0.15% of oxalic acid, and curing in film form at 100° C. for 2 hours, produced a thin cured film having a tensile strength of 138 lbs./sq. in. at 500% elongation and a modulus of 62 lbs./sq. in. at 100% elongation.

The same formula was used to saturate 27 lbs. "Duracel" crepe paper, 13.5 grains dry weight being added per 24 sq. in., and the sheet was heated for 30 minutes at 250°F. It was then further coated on one side with a light coating of a backsizing composition consisting of three parts of heat-reactive alcohol-soluble urea-formaldehyde resin ("Uformite F–200–E") and approximately one part of a non-oxidizing castor oil alkyd resin plasticizer ("Paraplex AL–16"), applied from solution in xylol and butanol to the extent of two grains per 24 sq. in., dry weight. The sheet was again heated, this time for about 10 minutes at 250°F. It was then coated on the other or face side with an aqueous adhesive primer solution consisting essentially of rubber latex and alkali caseinate, and after drying was coated with a rubber-resin type pressure-sensitive adhesive consisting essentially of natural rubber and polymerized terpene resin ("Piccolyte S–125"). The resulting pressure-sensitive adhesive tape was extremely resistant to penetration by oils, solvents, and lacquer components, was high in dielectric strength, highly resistant to weathering, and had the surprisingly high tensile strength, for this class of tape, of 26 lbs. per inch width.

*Example 5*

|  | Mols |
|---|---|
| Phenyldiethanolamine | 5 |
| Monoethanolamine | 5 |
| Sebacic acid | 9.1 |
| Maleic anhydride | 0.9 |

Heating the reactants in xylol for 3½ hours at 138–170°C., 3¼ hours at 170–200°C., and 3 hours at 200–205°C. produced a polymer having a acid number of 12.6. The amount of water removed during the reaction was 97.5% of theoretical. Diluting with isopropanol to a solids content of 60% gave a solution slightly more viscous than Z–3 on the Gardner-Holdt scale.

Cured by heating for 2 hours at 250°C. in a thin film with 4% of soluble heat-reactive melamine-formaldehyde resin and 0.02% of oxalic acid, the polymer had a tensile strength of 172 lbs./sq. in. at 400% elongation and a modulus of 107 lbs./sq. in. at 100% elongation. The same formula, applied as an impregnant to 27 lb. "Duracel" crepe paper and heated for 30 minutes at 250°F., produced a unified backing which when backsized, primed, and adhesive coated as in Example 4 produced a highly flexible, oil-resistant and weather-resistant pressure-sensitive adhesive tape. In this example the pressure-sensitive adhesive was a combination of natural rubber, pale gum rosin, and zinc oxide. The tape product exhibited 19% elongation and a tensile strength of 20–21 lbs. per inch width, and was particularly useful for masking curves and on curved surfaces.

*Example 6*

|  | Mols |
|---|---|
| Phenyldiethanolamine | 2 |
| Phenylethanolamine | 2. |
| Dimerized linoleic acid | 1 |
| Diglycolic acid | 2.64 |
| Maleic anhydride | 0.36 |

After about seven hours' refluxing with xylol as in the previous examples, the temperature reached 197°C. and the polymer had an acid number of 17. It was soluble at 60% solids in a 2:1 mixture of xylene and isopropanol. Addition of 4% of soluble heat-reactive melamine-formaldehyde resin and heating for 2 hours at 115° C., in the form of thin cast films 0.015 inch thick, produced strong self-supporting cured films having a tensile strength of 236 lbs./sq. in. at 430% elongation and a modulus of 140 lbs./sq. in. at 100% elongation. Saturating paper when treated with this formula as in the preceding examples provides a flexible, strong and tough, solvent-resistant and weather-resistant backing for pressure-sensitive adhesive tape.

*Example 7*

|  | Mols |
|---|---|
| Phenyldiethanolamine | 4 |
| Dimerized linoleic acid | 2 |
| Succinic acid | 1.64 |
| Maleic anhydride | .36 |

The reaction was carried out in the previously described manner until a 62% solution of the polymer in a mixture of equal volumes of isopropanol and xylol had a Gardner-Holdt viscosity of U. The acid number of the polymer was 8. With 6% of soluble, heat-reactive melamine-formaldehyde resin as the curing agent, and .06% of phthalic acid as catalyst, the polymer cured in 2 hours at 100° C. to an extremely supple pale colored elastic film having a modulus at 100% elongation of 66 lbs./sq. in. and a tensile strength of 73 lbs./sq. in. at 315% elongation. Such a solution is useful as an impregnant for porous paper or the like in providing a solvent-resistant, weather-resistant, tough and highly flexible unified fibrous backing for pressure-sensitive adhesive tape.

Carrying out the condensation reaction in the presence of a water-immiscible solvent such as xylol, as illustrated in the examples, affords close control of the progress of the reaction and in general is a highly effective and desirable procedure. Equally good results may be obtained, however, by cooking the reactants together in the absence of such solvent, although preferably under an inert atmosphere. The resulting resin is a sticky, stringy liquid at the final reaction temperature, and is somewhat less conveniently soluble than when produced in the presence of xylol as described in the examples.

The impregnated fibrous backings are fully cured, as indicated in the examples, by heating for 30 minutes at 250° F., a procedure which is normally carried out by suspending the treated sheet in continuous loops in an oven for the required time. Lower temperatures require longer curing times and are less desirable; higher temperatures are effective, but precautions must be taken not to scorch or otherwise degrade the fibrous base. Curing at 300° F. is accomplished in about 5–6 minutes; longer cures, up to start of degradation of the paper base, surprisingly do not cause embrittling or loss of strength from overcuring.

*Example 8*

Samples of four mil "Flexrope" flat saturating paper were impregnated with solutions of a polymer prepared as in Example 4 and containing as curing agents, in one case 2% of melamine-formaldehyde resin, and in the other case 7% of phenol-formaldehyde resin, together with acid catalysts. The treated webs were heated and cured, backsized as in Example 4, and coated with pressure-sensitive adhesive. The resulting tape products were high in dielectric strength and the treated backings did not delaminate when the tape was stripped from surfaces to which temporarily adhered. The tapes were non-corrosive toward fine copper wires and were useful in holding such wires on cores in the winding of electrical coils. The tensile strength of the tape was about 60 lbs. per inch width.

Paraformaldehyde, adipaldehyde, and glyoxal are also useful as curing agents for the soluble amido or amino ester polymer impregnant, as are soluble heat-reactive urea-aldehyde resins, such as "Uformite F–200–E." The heat-reactive amino-aldehyde and phenol-aldehyde resins contain active methylol groups, are reactive with the polymers, and, since they are derived from aldehydes, are here identified, together with the aldehydes themselves, as aldehydic curing agents.

The action of these aldehydic curing agents in converting the low molecular weight, soluble polymers to the higher molecular weight, insoluble state is speeded up by the catalytic action of a small amount of acidic material such as oxalic, phthalic, salicylic, lactic, maleic or citric acid.

The properties of the cured films, and hence also of impregnated or treated sheet material carrying the cured polymeric resinous product, are dependent on the amount of aldehydic curing agent employed as well as the nature of the specific curing agent. Increased amounts of curing or cross-linking agent will tend to produce greater stiffness and solvent resistance with a given polymer composition. Dialdehydes such as glyoxal tend to produce a cured product having lower modulus than is obtained by use of a more complex agent of higher functionality such as a soluble heat-reactive melamine-formaldehyde condensate having a multiplicity of active methylol or methylol ether groups on a relatively rigid molecular skeleton. Since phenol-formaldehyde condensates are frequently more readily compatible with the polymers than are the polyaldehydes or the amino-aldehyde condensates, these curing agents may be incorporated in somewhat larger proportions.

The impregnating compositions employed in the preparation of impregnated paper tape backings in accordance with the principles of this invention are required to have certain specific qualities and properties. They must be soluble, or at least dispersible as particles of almost colloidal size, in economically available volatile solvents, to provide solutions having a solids content of at least about 50% and a viscosity, measured at 100° F., preferably within the range of about 2000–4500 centipoises, and certainly within the range of 1000–6000 centipoises; and the solution must not be unduly "stringy" or "cobwebby" for easy application on squeeze rolls. They must be capable of adhering strongly to the fibers of the fibrous base and must be film-forming. They must be stable at room temperature so that the solution can be stored before using, but must be readily reactive or curable at moderately elevated temperatures suitable for use with the fibrous web employed. When cured, the impregnant must be oil- and solvent-resistant, strong, tough, flexible and stretchable.

These several properties are obtained with those amino and amido ester polymers as herein identified and exemplified which, when combined with small amounts of aldehydic curing agents and heated in the form of thin films as described in connection with the several examples, provide cured films having at break a tensile strength of at least about 70 lbs./sq. in. at an elongation of at least about 300%, and a modulus at 100% elongation of about 30–160 lbs./sq. in.

The surprising adaptability of these polymeric materials to reaction with aldehydic curing agents and to formation of impregnated fibrous sheet materials having the required combination of properties is not to be found in any prior art disclosures of which we are aware, and is an empirical discovery.

Each of the examples given employs phenyldiethanolamine as a significant component. Meta-tolyldiethanolamine, and a mixture of o-tolylethanolamine and o-tolyldiethanolamine having an average molecular weight of 162, have been substituted for the phenyldiethanolamine to form useful impregnating compositions and represent equivalent N-aryl dialkanolamines. In all cases the aryl group is required to have at least one active hydrogen atom, i. e. it contains at least one hydrogen atom in a position either ortho or para, and preferably para, to the position of the nitrogen atom, and furthermore contains no other substituent groups which would deactivate such active hydrogen atom. Surprisingly, the presence of the tertiary amino nitrogen atom in these compounds does not produce undue water-sensitivity in the polymer, and the treated tape backing is highly resistant to water and to weathering.

Certain precautions to be observed in obtaining the desired resinous products employed in this invention may be mentioned. When a considerable proportion of the dicarboxylic acid component is chosen from acids such as diglycolic or glutaric acid, which readily form cyclic imides, then alkanolamines having primary amino groups should be excluded or at least greatly restricted, since the formation from such reactants of a cyclic imide prevents the desired growth of the polymer chain. Linear components, and components providing a higher frequency of polar groups in the polymer chain, tend to produce stiffer and less stretchy cured films. Greater elasticity and softness is obtained by selecting components having side chains or radicals, or a low incidence of polar groups. The same effect is generally obtained by any of several known compositional or procedural devices which destroy the symmetry of the polymer chain.

In certain of the specific examples hereinbefore set forth, primary alkanolamines are employed in conjunction with the N-aryl dialkanolamines. In such cases, the use of a short-chain linear monoalkanolamine, such as monoethanolamine, in amounts greater than about one-half of the total non-acidic reactants, tends to reduce the solubility of the resulting polymer. Substitution of a branched-chain primary alkanolamine, e. g. monoisopropanolamine or 2-amino-1-butanol, for the monoethanolamine on the other hand tends to improve slightly the solubility of the polymeric product. Alkanolamines having a primary amino group attached to a tertiary carbon atom are less useful than those in which the primary amino group is attached to a non-tertiary, i. e. a primary or secondary, carbon atom.

It will be apparent from the several examples that the molar quantities of acidic reactants and of hydroxyl- or non-tertiary-amino-containing reactants are in each case substantially equivalent, i. e. that the number of reactive carboxyl groups available is substantially the same as the number of reactive hydroxyl and amino groups. Within these limitations, additional substitutions may be made. For example, up to about one-fifth of the total mol equivalents of alkanolamines may be replaced by unsymmetrical diamines such as 1,3-diaminobutane, or somewhat less in the case of ethylene diamine, without unduly diminishing the solubility or otherwise deleteriously affecting the properties of the polymeric products or the treated fibrous tape backings produced therewith. Maleic acid is surprisingly found to provide enhanced solubility of the polymer at room temperatures and accordingly is preferred; but this unsaturated dicarboxylic acid may be replaced by saturated acids with no loss of curability by aldehydic curing agents.

The N-aryl dialkanolamine provides potentially reactive sites for cross-linking by means of the aldehydic curing agents, and sufficient of this component must be present to provide in the polymer at least one

group for each 100 atoms in the polymer chain connecting such groups if an alkanolamine bearing a primary amino group is included, or for each 50 atoms in the chain in the absence of such alkanolamine. In addition to the N-aryl dialkanolamine in the proportion indicated, there may be included non-cyclizable non-N-substituted monoalkanolamines (alkanolamines having a single primary amino group) and N-hydrocarbon-substituted monoalkanolamines, such as N-phenyl monoethanolamine, N-butyl monopropanolamine, N-benzyl monoethanolamine, and N-cyclohexyl monoethanolamine, as well as nitrogen-free dihydroxy compounds, i. e., glycols. The total of reactive amino and hydroxyl groups contained in such components must be substantially the same as the total of reactive carboxyl groups contained in the acidic components. Of these acidic components, at least about four-fifths, on a molar basis, must be dicarboxylic acids containing at least four carbon atoms in the skeletal chain, and containing essentially no conjugated unsaturation. Up to about one-fifth of the total mols of dicarboxylic acids may consist of unsaturated acid such as maleic, fumaric, itaconic, or citraconic acid or anhydride, or the adduct of maleic anhydride with a conjugated diene, e. g. butadiene or cyclopentadiene.

Additional examples of compositions which, when reacted to the indicated end-point by methods previously indicated, provide polymers which are curable to elastic rubbery films when heated in admixture with small amounts of aldehydic curing agents, and which provide impregnants for saturating-paper which are useful, although less desirable than those of Examples 1–8, in the preparation of unified fibrous backings for pressure-sensitive adhesive tapes, are included herebelow.

*Example 9*

|  | Mols |
|---|---|
| Phenyldiethanolamine | 2.1 |
| Monoethanolamine | 2.9 |
| Sebacic acid | 4.55 |
| Maleic anhydride | .45 |

React in xylol to acid number of 17. At temperatures below about 50° C., a 60% solution in isopropanol:xylol slowly sets to a soft mush or slurry; increasing the temperature provides a fluid solution which satisfactorily penetrates and impregnates saturating-paper.

*Example 10*

|  | Mols |
|---|---|
| Phenyldiethanolamine | 5 |
| Diglycolic acid | 5 |

Heating in the presence of xylol for 8 hours to 158° C. provided a polymer which required at least about 6% of melamine-formaldehyde resin curing agent to produce an effective cure and which was then more stiff and less elastic than desired but was useful in impregnated tape backings where a high degree of flexibility was not required.

*Example 11*

|  | Mols |
|---|---|
| Phenyldiethanolamine | 1 |
| Succinic acid | .91 |
| Maleic anhydride | .09 |

Reaction in xylol to an acid number of 10 provided a polymer which cured to the desired tensile and elastic properties when heated with 2–6% of melamine-formaldehyde resin. The viscosity of a 62% solution of the polymer in isopropanol:xylol was V–W on the Gardner-Holdt scale.

What is claimed is as follows:

1. The method of making a solvent-resistant unified fibrous web suitable for application as a pressure-sensitive adhesive tape backing, comprising: mixing together in solution in a volatile organic solvent a soluble nitrogen-containing polyester polymer as hereinafter defined and a small proportion of an aldehydic curing agent sufficient to produce with said polymer a heat-cured thin film having a modulus at 100% elongation of about 30–160 lbs./sq. in and a tensile strength of at least about 70 lbs./sq. in. at an elongation of at least about 300%; impregnating a thin porous flexible fibrous web therewith; and then drying and heating the impregnated web to cure the polymer and unify the web; said polymer being a low-acid-number soluble condensation product formed by simultaneously heating together substantially equimolar amounts of inter-reactive components consisting essentially of (a) dicarboxylic acids including at least about 80% of dicarboxylic acid having at least four carbon atoms in the skeletal chain, having the carboxyl groups attached to separate aliphatic carbon atoms, and having essentially no conjugated unsaturation, and not more than about 20% of dicarboxylic acid selected from the class consisting of maleic, fumaric, itaconic, and citraconic acids, and adducts of maleic anhydride with conjugated dienes; and (b) compounds reactive with said acids and selected from the class consisting of phenyldiethanolamine, noncyclizable monoalkanolamines having a single primary amino group, noncyclizable N-monohydrocarbon-substituted monoalkanolamines having a single secondary amino group, gycols, and mixtures thereof, and including phenyldiethanolamine in an amount sufficient to average at least one

group for each 100 atoms in the polymer chain connecting such groups; the relative amounts of said components being subject to the further conditions that (1) where the amount of phenyldiethanolamine is insufficient to average at least one

group for each 50 atoms in the polymer chain connecting such groups, then the (b) compounds must include at least a small proportion of said noncyclizable monoalkanolamine having a single primary amino group; and (2) where the dicarboxylic acid components include a considerable proportion of acids capable of readily forming cyclic imides, then said noncyclizable monoalkanolamine having a single primary amino group must be substantially excluded.

2. The method of making a solvent-resistant unified fibrous web suitable for application as a pressure-sensitive adhesive tape backing, comprising: mixing together in solution in a volatile organic solvent a soluble nitrogen-containing polyester polymer as hereinafter defined and about 2–6% of a soluble heat-reactive melamine-aldehyde resin curing agent, together with an acid catalyst; impregnating a thin porous flexible fibrous web therewith; and then drying and heating the impregnated web to cure the polymer and unify the web; said polymer being a low-acid-number soluble condensation product formed by simultaneously heating together substantially equimolar amounts of inter-reactive components consisting essentially of (a) dicarboxylic acids including at least about 80% of dicarboxylic acid having at least four carbon atoms in the skeletal chain and having essentially no conjugated unsaturation, and not more than about 20% of dicarboxylic acid selected from the class consisting of maleic, fumaric, itaconic, and citraconic acids, and adducts of maleic anhydride with conjugated dienes; and (b) compounds reactive with said acids and selected from the class consisting of phenyldiethanolamine, noncyclizable monoalkanolamines having a single primary amino group, noncyclizable N-monohydrocarbon-substituted monoalkanolamines having a single secondary amino group, glycols, and mixtures thereof, and including phenyldiethanolamine in an amount sufficient to average at least one

group for each 100 atoms in the polymer chain connecting such groups; the relative amounts of said components being subject to the further conditions that (1) where the amount of phenyldiethanolamine is insufficient to average at least one

group for each 50 atoms in the polymer chain connecting such groups, then the (b) compounds must include at least a small proportion of said noncyclizable monoalkanolamine having a single primary amino group; and (2) where the dicarboxylic acid components include a considerable proportion of acids capable of readily forming cyclic imides, then said noncyclizable monoalkanolamine having a single primary amino group must be substantially excluded.

3. In a pressure-sensitive adhesive tape having a coating of pressure-sensitive tape adhesive firmly adherently bonded to a backing member, a thin flexible fibrous backing member unified with a solvent-resistant cured polyester polymer in accordance with the method of claim 1.

4. In a pressure-sensitive adhesive tape having a coating of pressure-sensitive tape adhesive firmly adherently bonded to a backing member, a thin flexible fibrous backing member unified with a solvent-resistant cured polyester polymer in accordance with the method of claim 2.

References Cited in the file of this patent

UNITED STATES PATENTS

| | | |
|---|---|---|
| 2,379,413 | Bradley | July 3, 1945 |
| 2,484,416 | Martin | Oct. 11, 1949 |
| 2,490,002 | Jayne et al. | Nov. 29, 1949 |
| 2,607,783 | Turinsky | Aug. 19, 1952 |

OTHER REFERENCES

"Oil and Soap J." of April 1944, pp. 104–105.